US006892236B1

(12) United States Patent
Conrad et al.

(10) Patent No.: US 6,892,236 B1
(45) Date of Patent: May 10, 2005

(54) SYSTEM AND METHOD OF GENERATING COMPUTER SYSTEM PERFORMANCE REPORTS

(75) Inventors: Michael J. Conrad, Monroe, WA (US); Diana A. Carutasu, Bellevue, WA (US); John L. Miller, Bellevue, WA (US); Sarat C. Manni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/527,546

(22) Filed: Mar. 16, 2000

(51) Int. Cl.$^7$ ............................................. G06F 15/173
(52) U.S. Cl. ...................... 709/224; 709/223; 709/203; 709/217; 709/218; 714/47
(58) Field of Search ................................ 709/203, 223, 709/224, 217, 218; 714/47, 44

(56) References Cited

U.S. PATENT DOCUMENTS

| | | | | |
|---|---|---|---|---|
| 5,781,703 A | * | 7/1998 | Desai et al. | .................. 706/50 |
| 5,796,633 A | * | 8/1998 | Burgess et al. | ............. 702/187 |
| 6,098,181 A | * | 8/2000 | Hamilton et al. | ............. 714/25 |
| 6,148,335 A | * | 11/2000 | Haggard et al. | ............ 709/224 |
| 6,449,739 B1 | * | 9/2002 | Landan | ......................... 714/47 |

OTHER PUBLICATIONS

J. Perry & F.M. Matlovich, "SAS Measures Up: Computing System Metrics in Boeings REDARS Project", Proceedings of the 21$^{st}$ Annual SAS Users Group International Conference, pp. 1246–1249, 1996.

J.D. Guyton and M.F. Schwartz, "Experience with a Survey Tool for Discovering Network Time Protocol Servers", Proceedings of the 1994 USENIX Conference, pp. 257–265, 1994.

C. Sturdevant, "ManageX Widens Network Watch", PC Week, vol. 15, No. 36, p. 77, Sep. 7, 1998.

E. Peterson, "Manage X for Win NT Uses ActiveX to Patrol Systems", PC Week, vol. 14, No. 18, p. 113, May 5, 1997.

D. Radcliff, "The Pulse of Enterprise Performance", Software Magazine, vol. 17, No. 4, p. 58, Apr., 1997.

* cited by examiner

Primary Examiner—Glenton B. Burgess
Assistant Examiner—Kevin Parton
(74) Attorney, Agent, or Firm—Leydig, Voit & Mayer, Ltd

(57) ABSTRACT

A system and method for automated reporting of performance of computer system components uses a plurality of reporting clients for tracking system performance data and one or more reporting servers for automatically generating performance reports based on the performance data collected by the reporting clients. To provide extensibility, a plug-in module is provided for each of the reporting clients. The plug-in module registers performance metrics for a system component with the reporting client, tracks the performance metrics, and passes data on the performance metrics to the reporting client for reporting to the reporting server.

26 Claims, 9 Drawing Sheets

02. Machine : R-1C8, X86 UP, 2072 FREE
UPTIME : 110:04:06
STATUS : Passed
SUMDATA : // R-1C8: 2072  110:04:06
========================================
                  Metrics Report
Metric                     Value
----------------------------------------
Total SA's Current         46
Total SA's Peak            56
Authenticated Bytes sent   22,395,470,964
Policy Changes             4

========================================
              Kernel Memory Usage (bytes)
Component.  Start   Max    Current   Diff
----------------------------------------
IpSA        5984    32096  16864     10880
IpKE        4416    10400  5344      928

========================================
              User Memory + Handle Usage
Component   Type         Start    Max      Current  Diff
----------------------------------------
lsass   220 NonPagePool  58624    61696    61400    2776
            WorkingSet   3080192  3313664  2904064  -176128
            PageFileUsg  3112960  3215360  3092480  -20480
            Handles      353      372      359      6

========================================
                  Event Log Errors
Count  EvtID  Component    Event Text
----------------------------------------
2047   1000   Userenv      Windows did not apply extension
                           scripts because thre are no deleted or
                           changed Group Policy objects.
   5   1704   SceCli       Security policy in teh Group Policy
                           objects are applied successfully.

FIG. 8

SYSTEM AND METHOD OF GENERATING COMPUTER SYSTEM PERFORMANCE REPORTS

TECHNICAL FIELD OF THE INVENTION

This invention relates generally to computer system performance studies, and more particularly to the monitoring and reporting of operation characteristics of components of a computer system.

BACKGROUND OF THE INVENTION

A modern computer system is typically a complicated combination of software and hardware that has many different components for performing various functions and supporting various features. The optimal performance of a computer system often can be obtained only by continuously monitoring the health and performance of the components of the computer system, and correcting problems identified through such monitoring.

The need for continuous performance studies is present not only in operating an existing computer system but also in developing computer software and hardware products. For instance, during the development of an operating system, such as the Windows NT operating system by Microsoft Corporation, various components of the operating system are constantly being tested by subjecting them to strenuous operating conditions and observing whether they can withstand the heavy usage without failure. Such a performance study, often termed "stress testing," helps the software developers to identify the weak spots or defects in the components of the operating system and provides valuable information as to the causes of failure.

In this regard, the collection of meaningful data regarding the operation characteristics of the system components and the compilation of the collected data into reports in useful formats are critical aspects of an effective system performance study. For each of the components being monitored, there may be a number of statistical variables that are of interest and should be tracked. The collected statistical data then have to be presented in easy-to-understand formats to facilitate identification of the status of the components and diagnosis of problems. Moreover, the results of a performance study often are to be reviewed by different levels of management. To that end, it is often necessary to provide reports that summarize the results of the performance study on different levels of abstraction to suit the different information needs of the management. For instance, in a network environment, a network administrator may want to know the total number of calls processed by a given server in the network, while a top-level manager may only be interested in knowing the general health of the network.

Existing reporting tools for reporting the results of system performance studies, however, do not satisfactorily meet these reporting needs. For instance, in the example of software development of the operating system, the development team is divided into groups, with each group responsible for one or more components of the operating system. Stress tests for various components are run on a plurality of computers, and the states of the stressed components are closely monitored by the responsible groups. Generally, each group tracks and reports a variety of statistics collected from machines running the stress tests for its components, and shares the information within itself and with other groups. To that end, each group typically implements its own ad hoc tracking and reporting applications. Due to the various types of statistical data tracked by different groups and the inconsistent ways the data are reported, the stress data provided by one group often cannot be readily used with data provided by other groups for analysis and summary purposes. Moreover, information on critical system attributes necessary for monitoring system performance and health is often not uniformly tracked and in some cases are simply omitted from the tracking tools of some individual groups. Such an inconsistency in tracking critical system attributes makes it difficult to establish a baseline for system evaluation.

The need to generate useful reports from the collected data poses another problem. In many: cases, there are formatting requirements for stress reports that have to be adhered to. Experience has shown that constructing stress reports that meet the given formatting requirements is a very time-consuming task that is prone to errors. Often times such reports are generated by hand, requiring sometimes hours to assemble and format the relevant data. Moreover, the reporting needs often evolve over time, and it is difficult for the various developer groups to keep track of the ever-changing reporting requirements and formats and to rewrite their reporting software in response to the changes.

SUMMARY OF THE INVENTION

In view of the foregoing, the present invention provides a uniform, easily extensible, performance reporting framework that includes a plurality of reporting clients that concentrate on tracking and reporting performance data for various system components and one or more reporting servers for receiving the collected data from the reporting clients and generating performance reports from the received data. Each reporting client tracks component-specific metrics of interest for monitoring one or more system components. In addition, each of the reporting clients preferably tracks a core set of system attributes, such as memory usage and event logs, to facilitate system health analysis. Extensibility of the data collection is provided by the use of a plug-in for each reporting client. The reporting plug-in allows a user to define and register component-specific metrics and include code for tracking and providing the current status of the metrics on demand. Moreover, the plug-in module may also be used to specify how the data on the metrics are to be stored and presented in the performance report generated by the reporting server. The reporting server is configurable to provide summary-reports from data reported by the reporting clients as well as more detailed reports on a per-component asis and multi-component basis. The use of the reporting servers to handle the automated generation of performance reports provides uniformity in reporting formats and makes it easy to accommodate changing reporting requirements without the need to modify the underlying reporting clients. Reporting servers may forward performance data to a reporting super-server on a higher level of the reporting framework. The super-server may apply a higher level of abstraction to the data reported by the reporting servers to generate a low-detail high-level summary appropriate for reviewing the health and/or status of multiple components. The performance data may be selectively archived in a database to facilitate evaluation and trend analysis.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is an exemplary per-component detailed report generated by the reporting server.

DETAILED DESCRIPTION OF THE INVENTION

Figure 1:
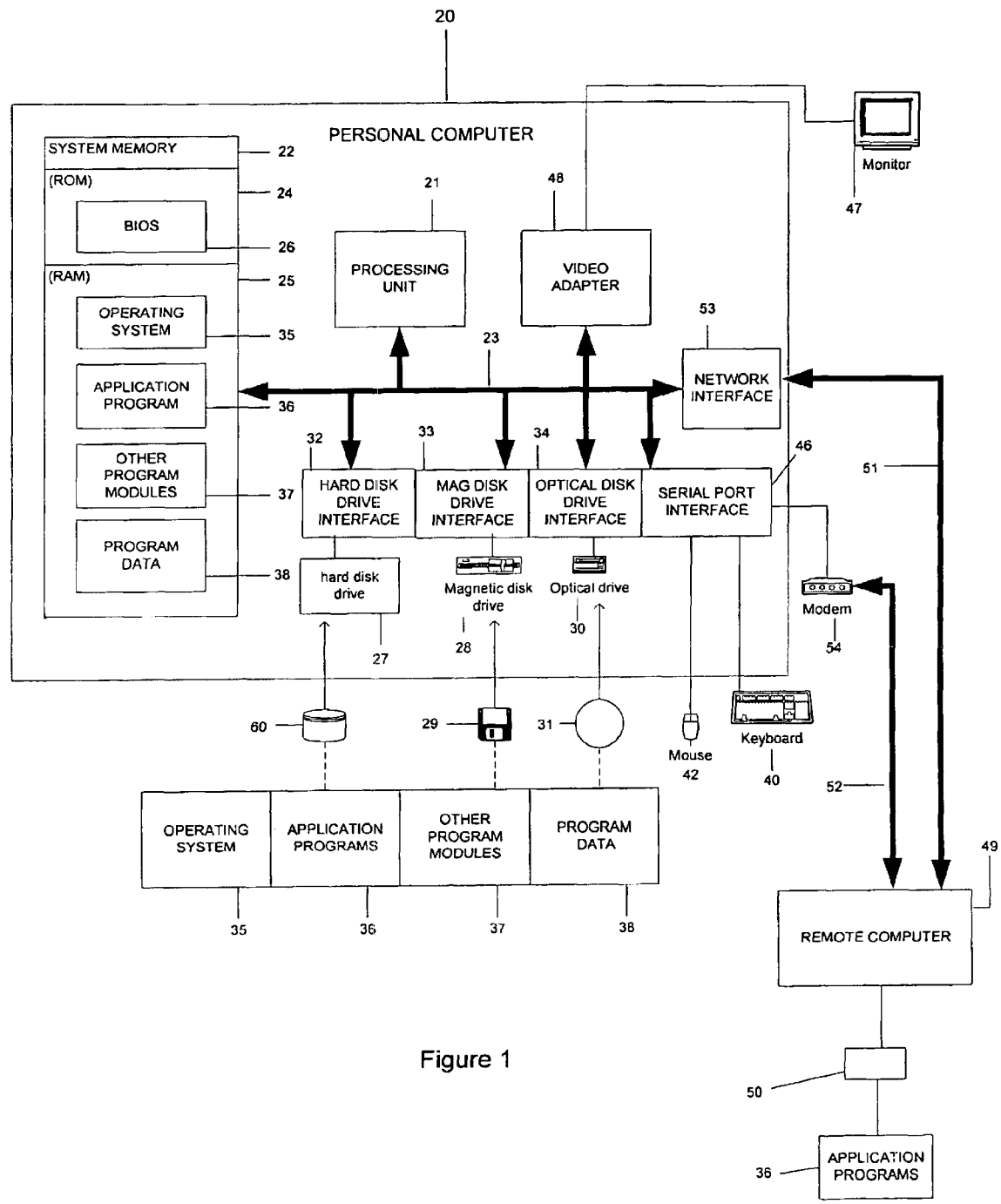
FIG. 1 is a block diagram generally illustrating an exemplary computer on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further may include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable fin media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such a's a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
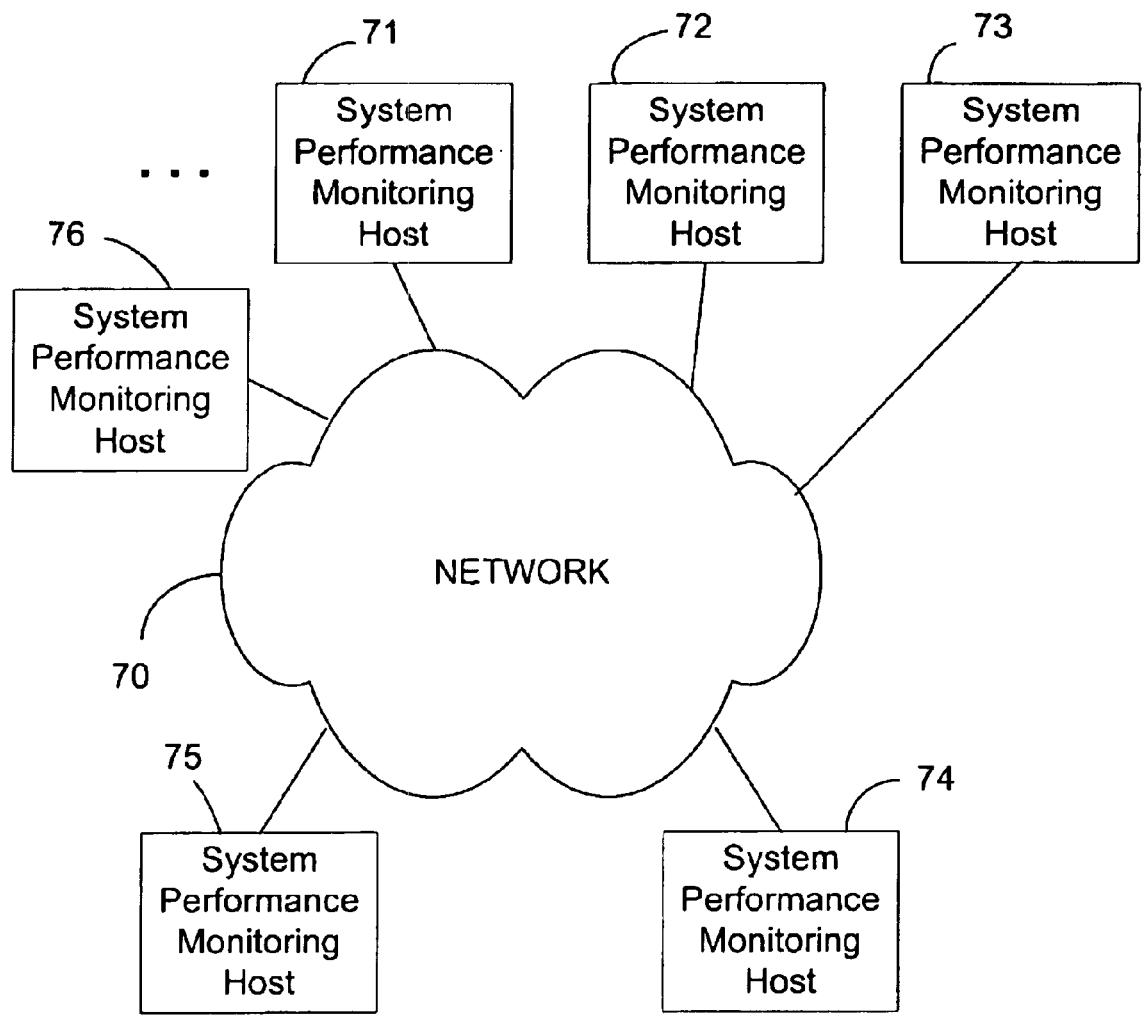
FIG. 2 is a schematic diagram showing a network with a plurality of performance monitoring hosts.

Referring now to FIG. 2, the present invention is directed to an improved way to collect and report system component performance data that provides extensibility in data collection and consistency, ease, and uniformity in reporting the results of the performance monitoring. As shown in FIG. 2, a networked computer system 70 may include many performance-monitoring machines 71-76, each of which may be directed to performance reporting for a specific component of the system. A component may be considered as a binary image or a set of binary images that work together to provide a service. Examples of such services in a networking context include a telnet server, a domain name system (DNS) server, services for MacIntosh routing, remote access server (RAS), etc. Examples of other types of services include audio and video recording/playback, USB device support, windowing services, file system management, and memory management. Because the monitoring of a given component of the system may require collection of statistical data specific to the component, it is highly desirable to enable a user responsible for the given component to define, collect, and report such component-specific data. On the other hand, in order to effectively use the collected data to assist performance review and system diagnosis, the data are to be reported in useful formats that summarize the data in suitable levels of abstraction. Moreover, it is desirable to have the performance data collected for different system components to be reported in a standardized manner. In this regard, it is also highly desirable to minimize the burden on the users responsible for the system components, in reporting the collected data and generating the performance reports.

Figure 3:
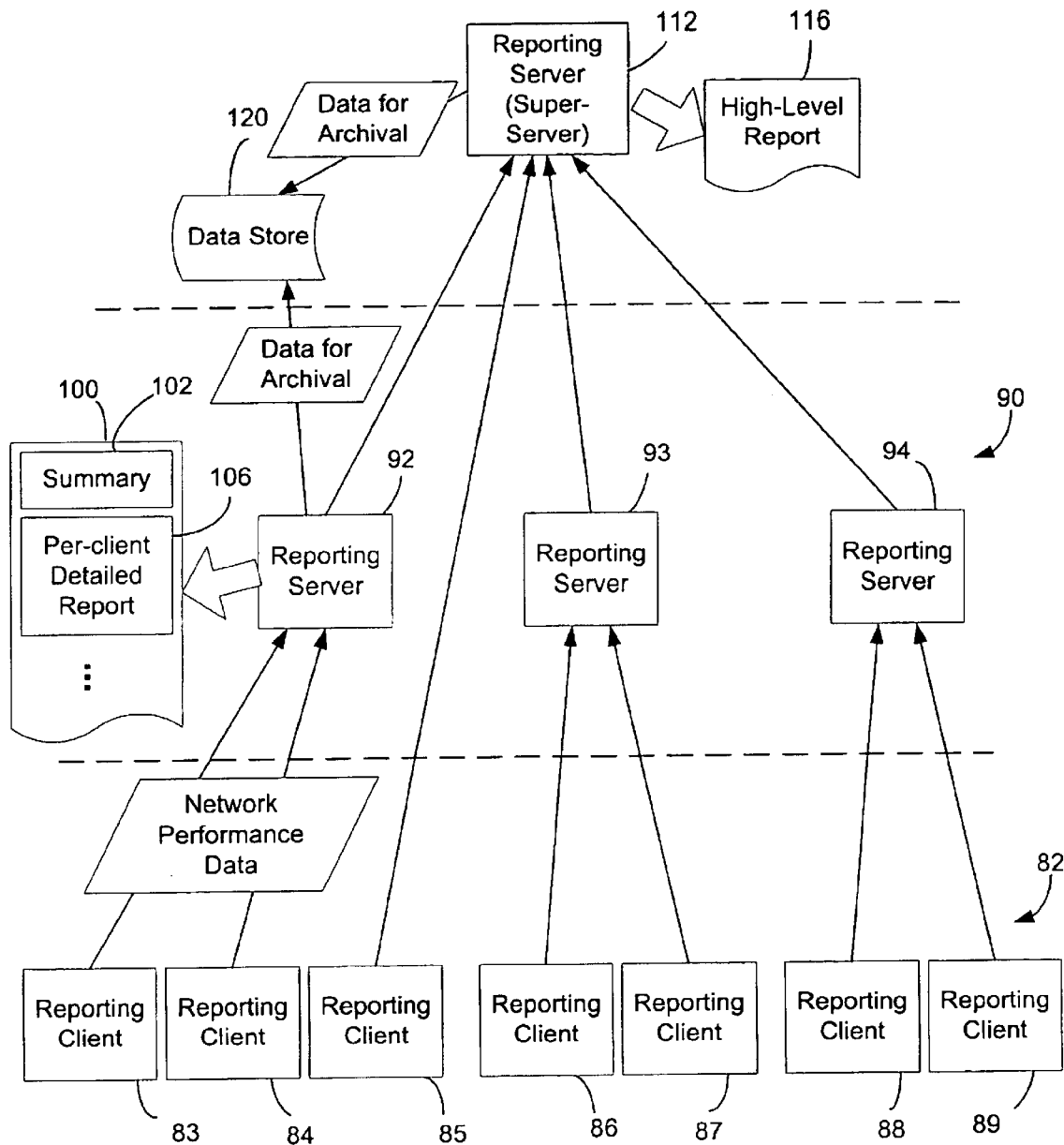
FIG. 3 is a schematic diagram showing an embodiment of a reporting network in accordance with the invention that includes multiple reporting clients and reporting servers.

The present invention effectively addresses these needs in reporting the performance of components of a computer system by providing a framework for automated performance reporting. As shown in FIG. 3, the reporting system in accordance with the invention includes multiple layers directed to different levels of abstraction for performance reporting. The bottom layer 82 includes a plurality of reporting clients 83–89 that are responsible for collecting statistical data relating to network performance of different system components. The next layer 90 of the reporting system includes, depending on the complexity of the network, one or more reporting servers, such-as servers 92–94. Each reporting server is responsible for receiving the statistical data collected by one or more reporting clients and presenting the received data in a report. For instance, in the illustrated example of FIG. 3, the reporting servers 92 receives performance data from reporting clients 83, 84 and generates a report 100. The report 100 may include a summary 102 that summarizes the performance data in a level of abstraction suitable for the managerial review intended for the report, and may also include a more detailed report 106 for each of the reporting clients reporting to the server. The reporting system may optionally have higher levels of reporting servers that receive data from reporting servers on a lower layer and generating a report of a higher level of abstraction than those of the lower level servers. For example, the embodiment of FIG. 3 includes a server 112 functioning as a "super-server" that receives data reported by the servers 92, 93, and 94 on the lower layer 90. The super-server 112 preferably can perform all the reporting functions of the reporting servers, plus the ability to generate a low-detail high-level report 116 suitable for reviewing the health or status of multiple sets of system components. It will be appreciated that more super-servers or servers on even higher layers may be provided in the framework if needed to accommodate the reporting needs of the network being monitored. Moreover, a reporting server does not have to be restricted to a single layer of the hierarchy. For example, the server 112 may function both as a reporting super-server in relation to the servers 92, 93, 94, and also as a server that receives reports directly from reporting clients, such as the reporting client 85.

In accordance with an aspect of the invention, each of the reporting servers on the different layers may store performance report data and other data in a data store 120, such-as an SQL database. Archiving the performance reporting data, which may be raw data or summarized data, allows easy evaluation and trending of data gathered across multiple reporting clients on a given set of hosts in the network.

The automated network performance report generation provided by the reporting framework according to the invention significantly simplifies the task of coalescing the collected statistical data into useful reports. By using report servers to handle report generation, the users of the reporting clients are allowed to concentrate on the collection and analysis of statistical data specific to the system component they are testing or studying. The use of report servers to generate reports also allows reports for various system components to be generated in a uniform manner with standardized formats. The reporting of component-specific data and attributes is supported, with the data presented in standardized, well-defined, places in the report that can be easily read and understood. Moreover, by using multiple layers of reporting servers, reports that summarize the system component performance in different levels of abstraction can be automatically generated to suit the information needs of various levels of management.

The division of the reporting system into reporting clients for collecting data and reporting servers for generating reports also makes it easier to modify the reporting system to accommodate changing reporting requirements. If the formats of the reports are to be changed only the reporting servers have to be modified to implement the changes. To that end, a modified reporting server application that automatically generates reports in the new format may be redistributed for installation on the machines running the reporting servers. The reporting clients, on the hand, do not have to be affected if the changes to the reports do not require modifications to their collection of statistical data.

In accordance with a feature of the invention, each reporting client is provided with the flexibility of defining the types of statistical data it will collect and report to an associated reporting server. To that end, each reporting client preferably includes a client application or module and a plug-in module. The client application provides baseline monitoring functionality and may be configured to selectively collect a set of "baseline" system attributes data, such as event logs, per-process memory usage and CPU time, etc. The plug-in, on the other hand, defines the specific performance data to be collected for a given system component and handles the collection of such component-specific data. In a preferred embodiment, these component-specific data are registered with the client module of the reporting client, which in turn registers the component-specific data with its associated reporting server. By providing core monitoring functionality in the reporting client, the reporting system allows critical system attributes to be uniformly monitored and rolled-up.

The component-specific data collected and reported by a reporting client can vary significantly depending on the nature of the system component monitored by the client. Generally, the data may include quantifiable statistical data commonly referred to as "metrics" and other data commonly called "free-form" data that are not readily amenable to quantification. For example, user-defined metrics may include number of connections, service response time, bytes of storage remaining, number of database queries, etc. The free-form data may include, for example, a list of network clients that have connected to a host in the last 24 hours, progress on important calculations, etc.

Figure 4:
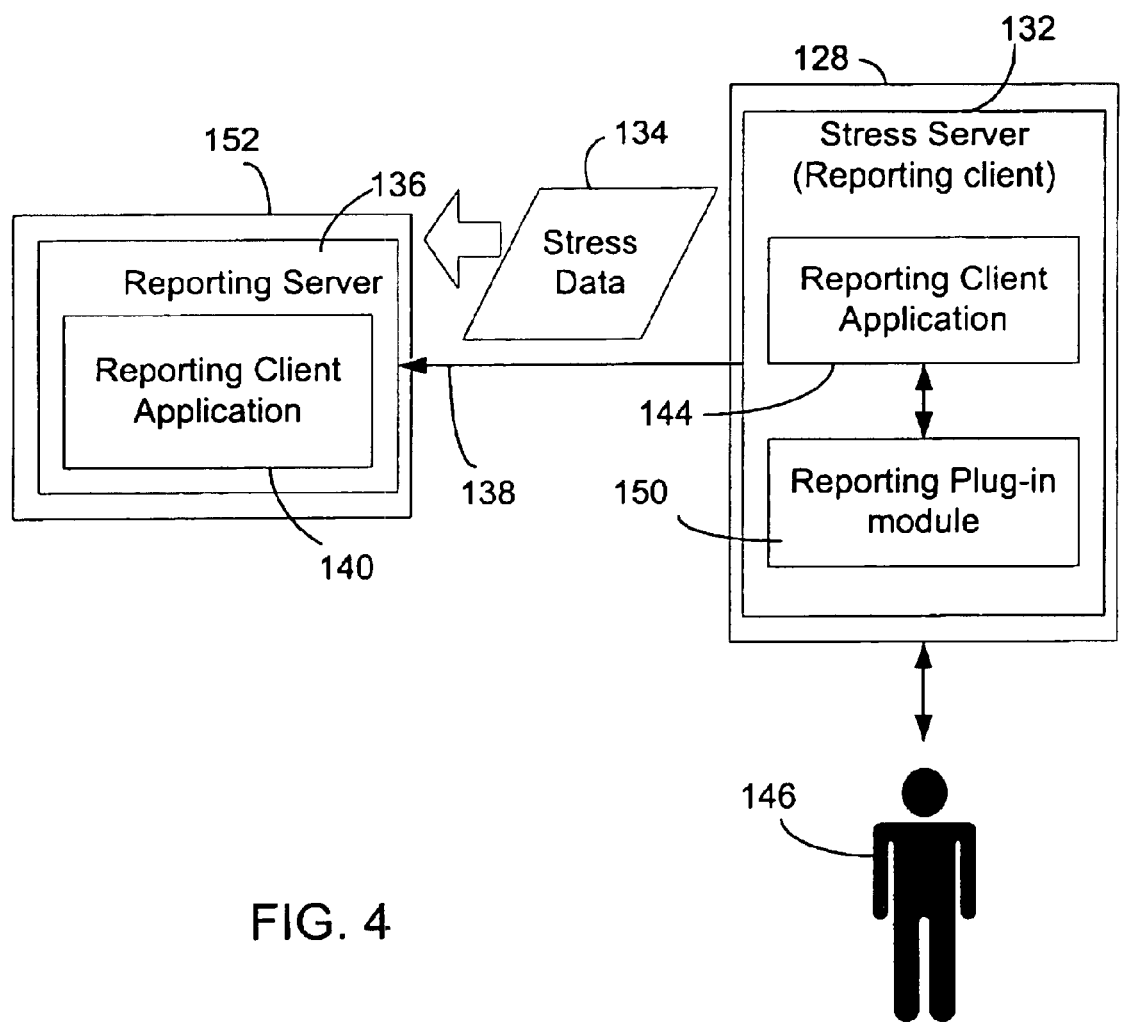
FIG. 4 is a schematic diagram showing a reporting client and a reporting server in the context of a system component stress study.

For illustration purposes, the following description describes a preferred embodiment implemented in the context of software development of an operating system with networking functionality. Although this embodiment shows an example of network performance monitoring in the context of software development, it will be appreciated that the invention may also be used in monitoring the performance of an existing network. In this embodiment, a plurality of networked computers (or "hosts") running the operating system are subjected to stress testing. Each computer is directed to monitoring how one or more system components of the operating system perform in the stress tests, and the operation data relevant for the performance of that component are collected and reported for analysis and review. In this regard, referring to FIG. 4, a host 128 involved in the stress study may have one or more reporting clients 132 each operating as a "stress server." Each stress server tracks stress test data that include a core set of system attributes as well as information specific to the system component monitored by the stress server. The core set of system attributes includes, for instance, host configuration, build number, memory and handle usage, and event logs generated during stress. The stress data 134 collected by the stress server 132 is then reported to its associated reporting server 136 through a named pipe 138.

In accordance with an aspect of the embodiment, to minimize the efforts required in implementing the reporting system, the software application or module 140 implementing the reporting server is prepared and distributed to the groups of the development team responsible for different networking components. One computer of each group is designated as the reporting server 136 and runs the reporting server application 140. Likewise, a standard client application or module 144 is prepared and distributed for running on each host computer 128 in the stress study. The client application 144 is configurable by a user 146 responsible for testing the given system component for selectively tracking the system attributes. The user is only required to provide a plug-in module 150 for use with the provided client application 144 to track and report component-specific stress data. In this regard, to help the user 146 in developing the component-specific plug-in 150, preferably a sample plug-in module that can be easily modified to define and track the component-specific stress data is distributed to different component groups. The user can then modify the sample reporting server to provide tracking of the component-specific metrics, as will be described in greater detail below.

Figure 5:
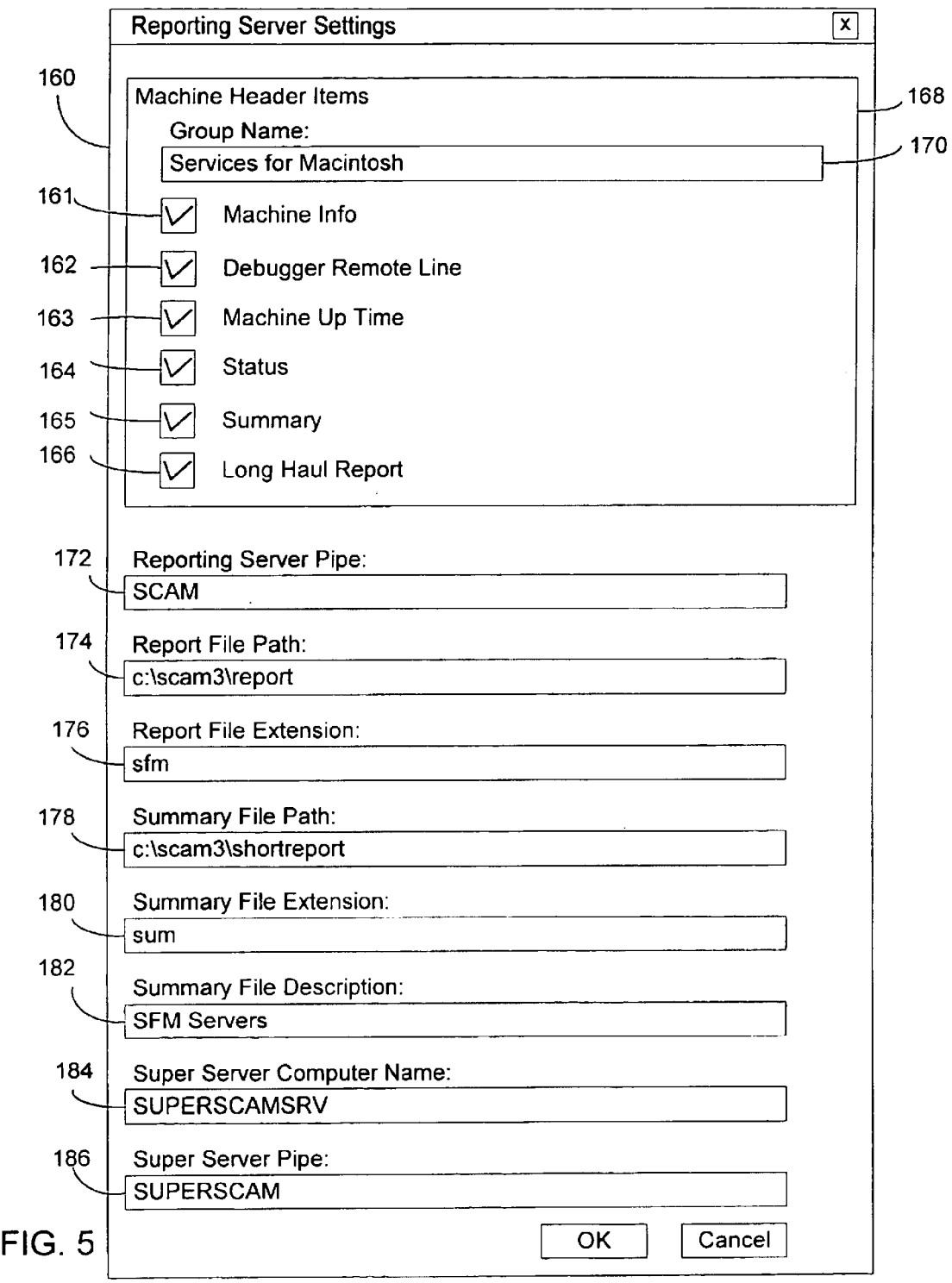
FIG. 5 is a schematic diagram showing a user-interface dialog box for a user to set up a reporting server.

After the server application 140 is loaded onto a designated reporting server host 152, it is set up for the reporting task in the specific environment. To simplify the task of setting up the reporting server, user-interface including set-up dialog boxes is preferably provided to guide a user in providing the needed set-up information. In one implementation, a user is presented with a set-up dialog box by selecting a "View-> Server Settings" menu item. As showing in the exemplary dialog box 160 of FIG. 5, the dialog box includes a plurality of check-boxes for and fields for the user to configure the reporting server.

In this illustrated example, the first portion 168 of the dialog box 160 is for the user to select the information to be included in header portion the report generated by this report server. The Group Name field 170 is for the user to enter the name of the software development group that will use this report server for performance reporting. The checkboxes 161–166 are for the user to select information describing the machine on which the reporting server resides for inclusion in the stress report. When the "Machine Info." box 161 is checked, a server details header in the report will include a "MACHINE:" line that includes the server name, processor architecture, number of processors, build, and type of build. The server details hearer is used to provide additional system configuration information on a per-server basis, such as the software version, machine name, and debugger used for that machine, etc. Checking the "Debugger Remote Line" box 162 will cause the report header to include the remote server information for connecting to that server's debugger. When the "Machine Up Time" box 163 is checked, the report header will include an "UPTIME" line in the header. When the "Status" box 164 is checked, a "STATUS:" line will be included in the header. This line indicates whether the stress test is considered as PASSED, FAILED, LOST, or any other status listed in a ProvideReportBuffer function as will be described in greater detail below. When the "Summary" box 165 is checked, an overall stress summary table showing the name and status of all servers in the stress testing imprinted at the top of the stress report. When the "Long Haul Report" box 166 is checked, any long haul servers involved in the stress testing are summarized at the top of the report. An example of a machine header is provided as follows

| 01. | MACHINE | JOHMIL-DTC1, x86 UP, 2116 FREE |
| | REMOTE | REMOTE/c johnmil-lap JOHNMIL-DTC1 |
| | UPTIME | 3:45;25 |
| | PRIVATES | fish.sys |
| | SUMDATA | ///JOHNML-DTC1: 2116+P 3:45:25 |

As to the other fields in the dialog box 160, the Reporting Server Pipe Name field 172 allows the user to specify a named pipe for a reporting client to communicate with the reporting server. The Report File Path field 174 is for specifying the directory where the reporting server is to save the stress report it generates. After the server receives data from a reporting client, it outputs all received data to this file. The Report File Extension field 176 allows the user to enter a file name extension for distinguishing the stress reports for the components of the user's group from those for other components. The Summary FILE is usually a single strictly formatted line, such as:

SFM Servers 1 1 (100%)

In the illustrated embodiment, there are two basic designations of stress servers: nightly stress servers that run overnight and are then reset, and long-haul stress servers that are run until they fail or until the build being tested is so old that testing it is no longer useful. These two types of servers are tallied differently because the failures encountered indicate different types: of issues. The number of servers that are being monitored (i.e., the number of reporting clients) does not include long-haul servers in this embodiment. The Summary File Description field 182 is for entering the name of the component to be monitored. The Super Server Computer Name 184 field allows the user to specify a super server that creates stress summaries from multiple component stress reports. The Super Server Pipe field 186 is for specifying a named pipe for the reporting server to communicate with the super server.

Figure 6:
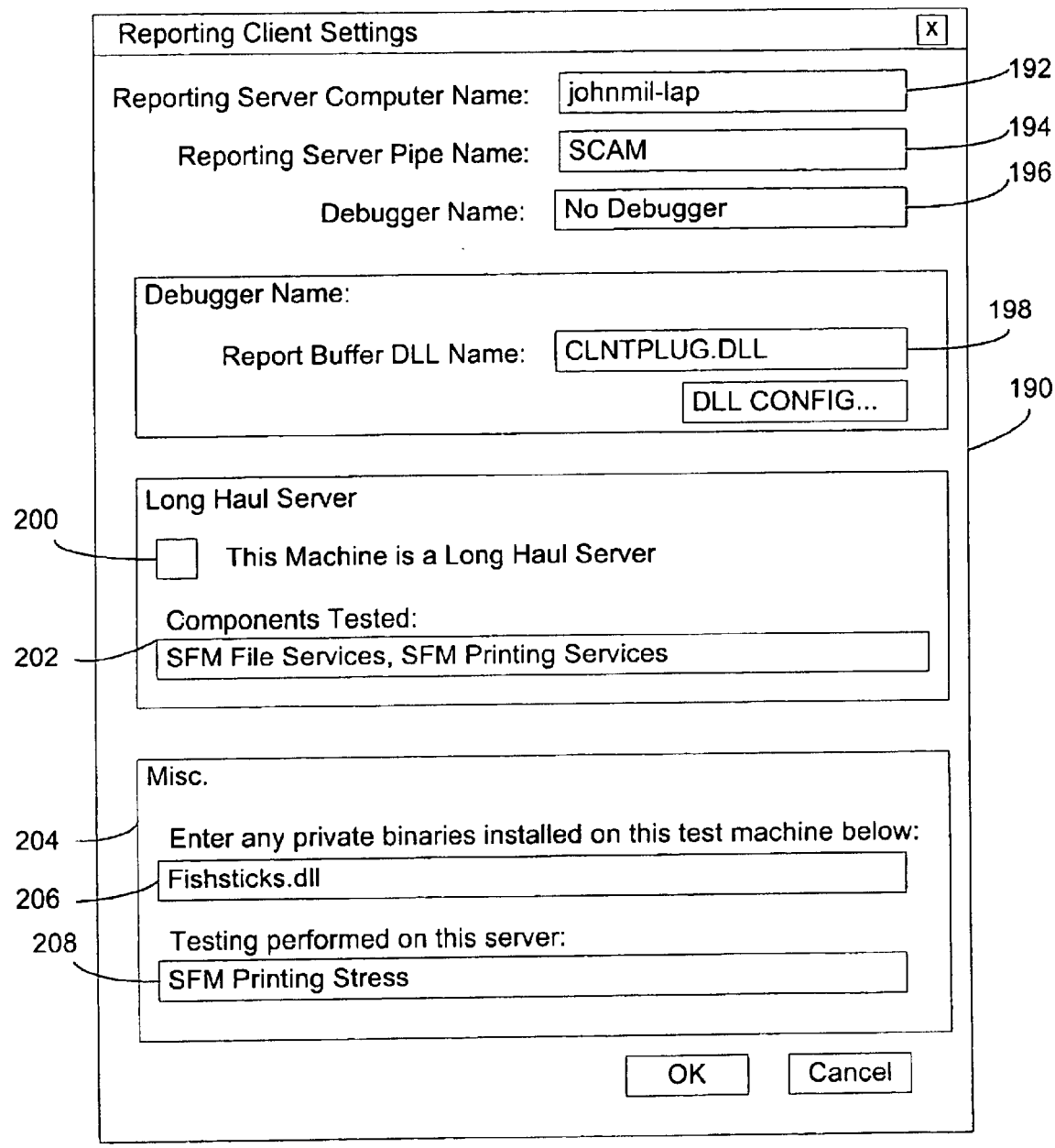
FIG. 6 is a schematic diagram showing a user-interface dialog box for a user to set up a reporting client.

After the reporting server 152 is set up, a reporting client application 144 is set up on each of the stress servers. User Interface is also preferably used for allowing the user to enter setup information for the reporting client. In one implementation, a Client Setting dialog box is shown by choosing the View->Client Settings menu item. An exemplary Client Setting dialog box 190 is shown in FIG. 6. The Reporting Server Computer Name field 192 in this dialog box is for entering the name of the computer that the reporting server is running on. The reporting client uses this name as part of the pipe name to find and communicate with the reporting server 136. All reporting clients for the stress testing of a given system component preferably report the data they collect to a single reporting server. The Reporting Server Pipe Name field 194 is the name of the pipe given in the reporting server settings. The reporting client and the reporting server should use the same named pipe to avoid communication failure. The Debugger Name field 196 is for entering the name of a kernel debugger attached to the computer that the reporting client application is running on. The Customer Report Buffer Name field 198 is for the user to specify the name of a dynamic link library (DLL) file that functions as a plug-in for the client application. As described above, the DLL is provided for defining and tracking component-specific data. The long-haul Server checkbox 200 when checked indicates that the machine running the client application is a long-haul stress server. The reporting server can use this information to provide a separate summary block just for this stress server. A sample long-haul summary lock in the report by the reporting server is provided below:

| | |
|---|---|
| Longhaul Summary: | 1 servers 1 up (100%) |
| MACHINE: | SFM_LONGHAUL_S |
| BUILD: | 2059 |
| UPTIME: | 86:58:05 |
| MAX UPTIME: | 436:42:25 |
| MAX BUILD: | 2048 |
| COMPONENTS: | MacFile, MacPrint, ATCP, PPP |

The Components Tested field 202 is where the names of the components being stress tested under the long-haul scenario are entered.

In the MISC. block 204 of the dialog box, the first field 206 is for the user to enter any "privates" being run on the stress machine. Software development for large projects is usually done by collecting changes over a period of time (such as a day), compiling a full version of the product at that point, then releasing the generated binaries as a 'build'. Builds are often used by the entire team to test the product, and, in the case of operating systems, to develop the product as well. Developers often want to test unusually complex or risky fixes before making them part of the build, since checking bad code into the build can set the entire project back. To do this, they compile their own copy of any relevant binaries, and then replace the corresponding binaries in the current build with their private copies called "privates". A private may be a single binary, or a set of binaries. The privates are listed in the machine header in the report generated by the reporting server. The second field 208 in the MISC. block allows the user to provide a short description of the type of the stress testing occurring on the stress server machine. For example, if the user's group is operating a "Services For Macintosh" stress test, the user may enter "Mac File Stress" or "AppleTalk Router." Once the user has updated the settings for the reporting client and pressed the "OK" button in the dialog box, the reporting client immediately attempts to connect to the reporting server.

As mentioned above, in this embodiment for stress testing, the reporting client provides consistent tracking for both a core set of system attributes and component-specific attributes. The core set of system attributes includes, for example, memory and handle usage and event logging. The memory, handle, and event log tracking are most effective when they are limited to elements relevant to the component being stressed. By default, no memory and handle usage will be tracked, but all events generated during the stress testing will be tracked.

In addition to the core set of system attributes, the reporting client tracks statistics specific to the component being stress tested by providing the component-specific DLL on the reporting client. The quantifiable component-specific attributes, commonly referred to as "metrics," can be a variety of different things defined by the user. The only requirement in this embodiment for a metric is that it be an integer numeric quantity that fits in a longlong variable.

When each reporting client application is started, it queries its component DLL 150 for information regarding the component-specific metrics it wants to track. To communicate with the reporting server for this purpose, the component DLL implements specific functions that will be described in greater detail below. For example, one of the functions implemented by the DLL is for registering a label for each of the metrics (e.g., "# of Client Connections").

In accordance with a feature of the embodiment, the component DLL also indicates how the data regarding the metric are to be reported. For example, referring to FIG. 4, the DLL 150 can specify whether the current value of a metric, its maximum value, or its average should be reported in the stress report. The reporting client application 144 also queries the component DLL 150 to learn whether the component has passed or failed the stress testing. In this regard, the component DLL can programmatically determine the pass or fail status of the component stress testing, and returning an appropriate value to indicate the status. For example if a web server being stressed is no longer sending pages to web clients, the DLL for that component may return a value indicating that the web server has failed the stress test.

Figure 7:
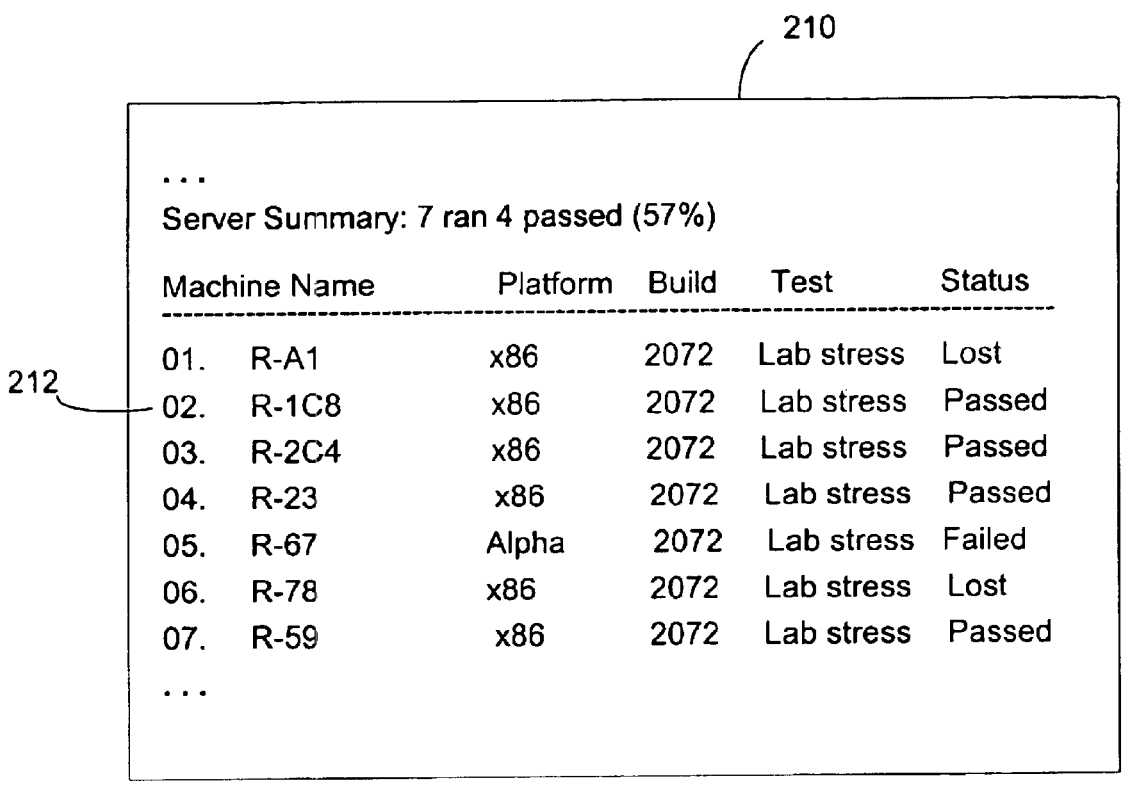
FIG. 7 is an exemplary summary report generated by a reporting server.

In accordance with an aspect of the invention, the reporting server 136 may provide a summary of the stress testing results of the reporting client that reports to it, as well as more detailed reports for each of the reporting client. For illustration purposes, an exemplary stress summary table 210 is provided in FIG. 7, and a detailed report for one of the stress servers listed in the stress summary table is provided in FIG. 8. The stress summary table identifies the machines on which the stress test was run, their platform and build, the stress test conducted, and their respective pass/fail status. One record 212 in the summary table 210 shows that a machine named R-1C8 has passed the stress test.

The detailed per-client report 216 generated by the reporting server 136 for this R-1C8 machine as shown in FIG. 8 includes a metrics Report section 218, a Kernel Memory Usage section-220, a User Memory+Handle Usage section 222, and an Event Log Errors section 224. The Metrics Report section 218 lists the descriptive labels for the metrics tracked and their respective values. The Event Log Errors section 224 identifies for each event log error the count, event ID, the component involved, and the event text.

Turning now to the preparation of a component DLL for performance reporting, each component DLL 150 exports well-known functions to the reporting client application 144 for communication therewith. These functions return component specific information and can also bemused to modify the behavior of the reporting server 136. As mentioned above, in a preferred implementation a sample report DLL is provided to the users of the reporting clients. The sample DLL, which includes code implementing all required entry points, can be easily modified to suit the data collecting and reporting requirements for a specific component.

Figure 9:
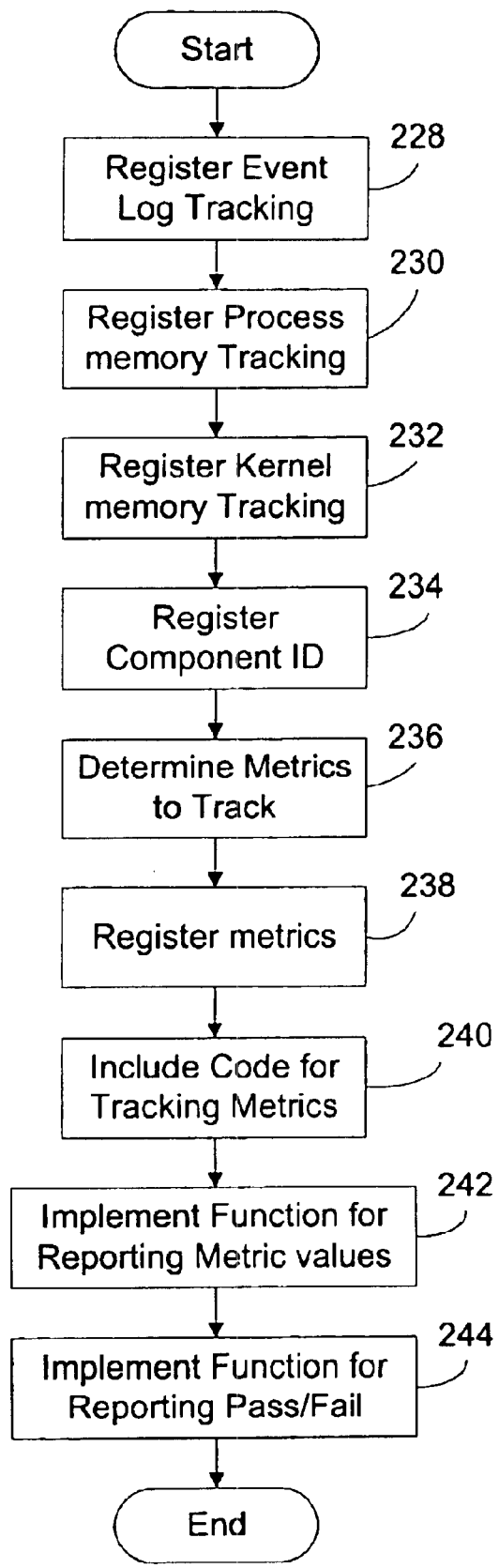
FIG. 9 is a flowchart showing a process of implementing a plug-in module for a reporting client in an embodiment of the invention.

Referring now to FIG. 9, in developing the component DLL, the user implements a SetComponentEvtTypes function in the DLL for registering with the client application how much detail the user wants on the event logs to be tracked (step 228). A function SetComponentProcesses is implemented to register process memory tracking options and memory tracking presentation options (step 230). A function SetComponentPoolTags is implemented for registering kernel memory tracking if the user has kernel memory pool tagging enabled and wants to track memory usage for specific kernel-mode components (step 232). If the component does not already have an assigned ordinal ID, the user makes an ordinal ID for her component and implements the function RegisterComponentID for registering that component ID (step 234).

The user also determines the component-specific metrics to be tracked and reported (step 236). A function RegisterUnitsCount is implemented for registering the number of metrics the user wants to track, and another function RegisterUnit is implemented for registering the labels for the component-specific metrics and the way each of the metrics should be summarized by the reporting server (step 238). To track the metrics, the user includes code in the DLL for deriving the current value of each of the metrics (step 240). If the user has already implemented in an old stress-reporting tool the code for tracking the metrics, such old code may be reused by simply cutting and pasting it into the component DLL. The reporting of the metrics values is achieved by implementing a function SetUnitValue (step 242).

If the pass/fail status of the stress testing of the component is to be programmatically determined, the user modifies a ProvideReportBuffer function that performs the determination and reports the pass/fail result (step 244). This function can also be used to pass any out-of-band data that are not readily quantifiable and therefore not amenable to being treated as metrics.

The well-known-functions defined in this embodiment for use in the component-specific DLL, including those functions mentioned above in describing the DLL development process, are summarized below. The required functions in this embodiment and their purposes are as follows:
GetConfigInfo: For providing version information ProvideReportBuffer: For providing text data to be included in the per-client report and the pass/fail status of the component.

The optional functions and their purposes are as follows:
SetComponentEvtTypes: For limiting types of event logs to be tracked by the client application and specifying the degree to which the events encountered are displayed in the report.
SetComponentProcesses: For specifying the process names for memory/handle tracking and specifying the line items to be displayed for each process.
SetComponentPoolTags: For specifying kernel pool tags to track memory for tracking if pool tagging is enabled.
RegisterComponentID: For identifying the component this reporting DLL is written to track.
RegisterUnitsCount: For providing the number of component-specific metrics/units to be tracked.
RegisterUnit: For enumerating labels for the component-specific metrics and the way each metric should be summarized and/or presented.
SetUnitValue: For reporting the current value of a component-specific metric.
Config: For invoking a dialog to set any component-specific configuration.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer system performance reporting network comprising:
   a reporting server programmed to generate a performance report based on system performance data reported by a plurality of reporting clients; and
   the plurality of reporting clients, each reporting client comprising:
      a client module programmed to, at least, communicate with the reporting server; and
      a plug-in module for the client module programmed to, at least, track a first set of performance metrics for a system component;
   wherein each plug-in module of the plurality of reporting clients exports a set of functions to the client module, the set of functions comprising:
      a first function for registering the first set of performance metrics with the client module; and
      a second function for passing at least one of the first set of performance metrics to the client module.

2. The computer system performance reporting network of claim 1, wherein each client module of the plurality of reporting clients is further programmed to, at least, track a second set of performance metrics for the system component.

3. The computer system performance reporting network of claim 2, wherein the set of functions further comprises a third function for specifying, to the client module, at least one type of event log to be tracked to produce at least one performance metric for inclusion in the second set of performance metrics.

4. The computer system performance reporting network of claim 2, wherein the set of functions further comprises:
  a third function for specifying, to the client module, at least one process resource to be tracked to produce at least one performance metric for inclusion in the second set of performance metrics; and
  a fourth function for specifying, to the client module, at least one kernel resource to be tracked to produce at least one performance metric for inclusion in the second set of performance metrics.

5. The computer system performance reporting network of claim 1, wherein the set of functions further comprises a third function for registering, with the client module, an identifier for the system component associated with the first set of performance metrics.

6. The computer system performance reporting network of claim 1, wherein the set of functions further comprises a third function for invoking a dialog to set any component-specific configuration.

7. The computer system performance reporting network of claim 1, wherein the set of functions further comprises a third function for providing, to the client module, text data that the client module communicates substantially unchanged to the reporting server.

8. The computer system performance reporting network of claim 1, wherein registering the first set of performance metrics with the client module comprises specifying how at least one of the set of performance metrics is to be visually presented in the performance report generated by the reporting server.

9. A computer system performance reporting network as in claim 1, wherein the client module of each of the plurality of reporting clients selectively tracks a core set of system attributes.

10. A computer system performance reporting network as in claim 1, further including a reporting super-server for receiving system performance data from the reporting server and summarizing the system performance data received from the reporting server to generate another performance report.

11. A computer system performance reporting network as in claim 1, further including a data store for selectively archiving system performance data.

12. A computer system performance reporting network as in claim 1, wherein the plug-in module of at least one of the reporting clients is further programmed to, at least, provide data indicating a pass/fail status of a system component monitored by said at least one reporting client for inclusion in the performance report generated by the reporting server.

13. A computer system performance reporting network as in claim 1, wherein the plug-in module of at least one of the reporting clients is further programmed to, at least, register with the client module of said at least one reporting client an indication of how the data on the performance metrics are to be presented in the performance report generated by the reporting server.

14. A computer system performance reporting network as in claim 1, wherein the performance report generated by the reporting server includes a summary summarizing status of system components monitored by the reporting clients and a plurality of per-client detailed reports regarding the reporting client.

15. A method of generating a performance report for system components of a computer system, comprising the steps of:
  connecting a reporting server with a reporting client, the reporting client responsible for monitoring a system component and having a client module communicating with the reporting server and a plug-in module for use with the client module to track metrics specific to the system component, the plug-in module exporting a set of functions to the client module, the set of functions comprising:
    a first function for registering the metrics specific to the system component; and
    a second function for providing the metrics tracked by the plug-in module;
  registering, by the first function of the plug-in module, with the client module of the reporting client, the metrics specific to the system component for reporting to the reporting server;
  tracking, by the plug-in module, the metrics specific to the system component;
  providing, by the second function of the plug-in module, data on the metrics specific to the system component to the client module of the reporting client;
  passing, by the client module of the reporting client, performance data including the data on the metrics specific to the system component to the reporting server; and
  generating, by the reporting server, a performance report from the performance data passed by the reporting client.

16. A method as in claim 15, further including the step of tracking by the client module of the reporting client a core set of system attributes, and wherein the performance data passed by the reporting client to the reporting server includes data on the core set of system attributes.

17. A method as in claim 16, wherein the core set of system attributes includes memory usage and event log errors.

18. A method as in claim 16, further including the step of forwarding, by the reporting server, performance data to a reporting super-server.

19. A method as in claim 15, further including the step of selectively archiving performance data in a data store.

20. A method as in claim 15, wherein the step of registering the metrics includes providing an indication of how the data on the metrics are to be presented in the performance report generated by the reporting server.

21. A method as in claim 15, wherein the data on the metrics provided by the plug-in module includes a programmatically determined pass/fail status of the system component monitored by the reporting client.

22. A method as in claim 15, further including the step of providing, by the plug-in module, non-numeric performance data concerning the system component being monitored.

23. A computer-readable medium having computer-executable instructions for performing steps for monitoring performance of computer system components by a reporting client having a client module for communicating with a reporting server and, for each type of system component, a plug-in module for use with the client module to track performance metrics specific to the systems component, the plug-in module exporting a set of functions to the client module, the set of functions comprising a first function for registering the metrics specific to the system component and a second function for providing the metrics tracked by the plug-in module, the steps comprising:
  registering, by the first function of the plug-in module, with the client module, metrics specific to the system component being tracked by the plug-in module on a host computer of the reporting client;

tracking, by the plug-in module, the metrics specific to the system component during operation of the host computer;

providing, by the second function of the plug-in module, to the client module, data on the metrics specific to the system component from the tracking; and forwarding, by the client module of the reporting client, performance data including the data on the metrics specific to the system component to the reporting server for generating a performance report.

24. A computer-readable medium as in claim 23, wherein the step of registering the metrics includes providing an indication of how the data on the metrics are to be presented in the performance report.

25. A computer-readable medium as in claim 23, having further computer-executable instructions for performing the step of determining, by the plug-in module, a pass/fail status for the system component being monitored, and wherein the step of providing data on the metrics includes providing data indicating the determined pass/fail status.

26. A computer-readable medium as in claim 23, having further computer-executable instructions for performing the steps of collecting, by the client module of the reporting client, data on a core set of system attributes, and wherein the performance data forwarded to the reporting server for generating the performance report further includes the collected data on the core Set of system attributes.

* * * * *